US007293387B2

(12) United States Patent
Durand et al.

(10) Patent No.: US 7,293,387 B2
(45) Date of Patent: Nov. 13, 2007

(54) ATTRACTANT SYSTEM FOR MOUNTING TO AN INSECT TRAPPING APPARATUS

(75) Inventors: Emma A Durand, Jamestown, RI (US); Richard B. Dunne, Jamestown, RI (US); Miaoyong Cao, Warwick, RI (US); Cuixia Liu, Warwick, RI (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/862,898

(22) Filed: Jun. 8, 2004

(65) Prior Publication Data

US 2005/0268529 A1  Dec. 8, 2005

(51) Int. Cl.
*A01M 1/02* (2006.01)
(52) U.S. Cl. ....................................................... 43/107
(58) Field of Classification Search ................... 43/107, 43/122, 139
See application file for complete search history.

(56) References Cited

U.S. PATENT DOCUMENTS

| | | | |
|---|---|---|---|
| 1,693,369 A | 11/1928 | Cherry | |
| 2,893,161 A | 7/1959 | Reid | |
| 3,196,577 A | 7/1965 | Plunkett | |
| 3,708,908 A * | 1/1973 | Levey | 43/114 |
| 4,249,673 A | 2/1981 | Katoh et al. | |
| 4,506,473 A | 3/1985 | Waters, Jr. | |
| 4,519,776 A | 5/1985 | Deyoreo et al. | |
| 4,608,774 A | 9/1986 | Sherman | |
| 4,785,573 A | 11/1988 | Millard | |
| 4,802,303 A | 2/1989 | Floyd, III | |
| 5,157,865 A | 10/1992 | Chang | |
| 5,167,090 A | 12/1992 | Code | |
| 5,189,830 A | 3/1993 | Montemurro | |
| 5,205,064 A | 4/1993 | Nolen | |
| 5,205,065 A | 4/1993 | Wilson et al. | |
| 5,238,681 A | 8/1993 | Chang et al. | |
| 5,255,468 A | 10/1993 | Cheshire, Jr. | |
| 5,311,697 A | 5/1994 | Cavanaugh et al. | |
| 5,329,725 A | 7/1994 | Bible | |
| 5,382,422 A | 1/1995 | Dieguez et al. | |
| 5,417,009 A | 5/1995 | Butler et al. | |
| 5,490,349 A | 2/1996 | Muramatsu | |
| 5,501,033 A | 3/1996 | Wefler | |
| 5,595,018 A | 1/1997 | Wilbanks | |
| 5,647,164 A | 7/1997 | Yates | |
| 5,651,211 A | 7/1997 | Regan et al. | |
| 5,657,576 A | 8/1997 | Nicosia | |
| 5,669,176 A | 9/1997 | Miller | |
| 5,907,923 A * | 6/1999 | Heath et al. | 43/122 |

(Continued)

FOREIGN PATENT DOCUMENTS

FR          717903         1/1932

(Continued)

OTHER PUBLICATIONS

Owners Manual Bug Vac Model 1101, Mar. 17, 2003.

(Continued)

*Primary Examiner*—Kurt Rowan
(74) *Attorney, Agent, or Firm*—Jacobson Holman PLLC

(57) ABSTRACT

The present invention relates to an attractant system for mounting to an insect trapping apparatus.

31 Claims, 8 Drawing Sheets

U.S. PATENT DOCUMENTS

| | | | |
|---|---|---|---|
| 6,050,025 | A | 4/2000 | Wilbanks |
| 6,055,766 | A | 5/2000 | Nolen et al. |
| 6,132,203 | A | 10/2000 | Masin |
| 6,145,243 | A | 11/2000 | Wigton et al. |
| 6,286,249 | B1 | 9/2001 | Miller et al. |
| 6,393,760 | B1 * | 5/2002 | Lingren ............... 43/122 |
| 6,532,695 | B1 | 3/2003 | Alvarado |
| 6,594,946 | B2 | 7/2003 | Nolen et al. |
| 6,594,947 | B2 | 7/2003 | Lingren et al. |
| 6,655,080 | B2 | 12/2003 | Spiro et al. |
| 6,662,489 | B2 | 12/2003 | Spiro et al. |
| 6,718,685 | B2 | 4/2004 | Bossler |
| 6,898,896 | B1 * | 5/2005 | McBride et al. ............... 43/113 |
| 2003/0084604 | A1 | 5/2003 | Durand et al. |
| 2004/0001870 | A1 | 1/2004 | Durand et al. |
| 2004/0068932 | A1 | 4/2004 | Stewart |
| 2004/0103579 | A1 * | 6/2004 | Nolen et al. ............... 43/107 |
| 2004/0128902 | A1 * | 7/2004 | Kollars et al. ............... 43/107 |
| 2004/0139648 | A1 | 7/2004 | Durand et al. |
| 2004/0185080 | A1 * | 9/2004 | Hojo et al. ............... 424/405 |
| 2005/0019361 | A1 | 1/2005 | Durand et al. |

FOREIGN PATENT DOCUMENTS

| | | |
|---|---|---|
| JP | 64-14128 | 1/1989 |
| PL | 177390 | 11/1999 |
| WO | WO 99/52352 | 10/1999 |
| WO | WO03/028448 | 4/2003 |
| WO | WO 2004/028247 | 4/2004 |

OTHER PUBLICATIONS

Mosquito Ecology Field Sampling, 2nd ed., p. 500, 502, 517, 524, 546-547 (1993.

Carestia et al., "Effectiveness of Carbon Dioxide as a Mosquito Attractant in the CDC Miniature Light Trap," *Mosquito News*, 27(1):90-92 (1967).

Dipteran Collection equipment folder, American Biophysics Corp., Jul. 1994.

Burkett et al., "Light, Carbon Dioxide, and Octenol-Baited Mosquito Trap and Host-Seeking Activity Evaluations for Mosquitoes in a Malarious Area of the Republic of Korea," *J. Am. Mosquito Control Assn.*, 17(3):196-205 (2001).

Floore et al., "Mosquito Trapping Studies to Determine Efficacy of Two Models of the Flowtron® Mosquito Luring Device," *J. Florida Anti-Mosquito Assn.*, 56(1):13-17 (1985).

Grant et al., "Electrophysiological responses of receptor neurons in mosquito maxillary palp sensilla to carbon dioxide," *J. Comp. Physiol. A*. 177:389-396 (1995).

Kline, "Comparison of Two American Biophysics Mosquito Traps: The Professional and a New Counterflow Geometry Trap," *J. American Mosquito Control Assn.*, 15 (3):276-282 (1999).

Kubis, Database CAPLUS on STN, Am. Chemical Society, Columbus OH, Accession No. 2001:256247, PL177390, abstract.

Mboera et al., "Comparison of carbon dioxide-biated trapping systems for sampling outdoor mosquito populations in Tanzania," *Medical and Veterinary Entomology*, 14:257-263 (2000).

Peterson et al., "Studies of the Responses of the Female *Aedes* Mosquito," Dept. of Zoology, University of Western Ontario, London, Canada, pp. 535-541 (1951).

Service, "Sampling Adults by Animal Bait Catches and by Animal-Baited Traps," Mosquito Ecology Field Sampling Methods, Ch. 5, $2^{nd}$ ed. p. 349-498 (1995).

Service, "Sampling Adults with Carbon Dioxide Traps, Light-Traps, Visual Attraction Traps and Sound Traps," Mosquito Ecology Field Sampling Methods, Ch. 6, $2^{nd}$ ed., p. 499-610 (1995).

Sudia et al., "Battery-Operated Light Trap, An Improved Model," *J. Am. Mosquito Control Assn.*, 4(4):536-538 (1988).

Teledyne Brown Systems, Catalytic Burner literature.

U.S. Appl. No. 10/864,284, filed Jun. 8, 2004, Durand et al.

Bosch et al., "Contribution of Fatty Acids to Olfactory Host Finding of Female *Aedes Aegypti*," *Chem. Senses*, vol. 25, pp. 323-330, 2000.

Braks et al., "Incubated Human Sweat But Not Fresh Sweat Attracts the Malaria Mosquito *Anopheles gambiae Sensu Stricto*," *Journal of Chemcal Ecology*, vol. 25, No. 3, pp. 663-672, 1999.

Braks et al., "The Role of Human Sweat Components, Ammonia and L-Lactic Acid, in the Behaviour of the Anthropophilic Malaria Mosquito *Anopheles gambiae* (Diptera: *Culicidae*)," *Journal of Comparative Physiology A*.

Braverman et al., "Attractiveness of Vertebrate Hosts to *Culex pipiens* (Diptera: *Culicidae*) and Other Mosquitoes in Israel," *Journal of Medical Entomology*, vol. 28, No. 1, pp. 133-138, Jan. 1991.

Dekker et al., "L-Lactic Acid: A Human-Signifying Host Cue for the Anthropophilic Mosquito *Anopheles gambiae*," *Medical and Veterinary Entomology*, vol. 16, pp. 91-98, 2002.

Geier et al., "Ammonia as an Attractive Component of Host Odour for the Yellow Fever Mosquito, *Aedes aegypti*," *Chem. Senses*, vol. 24, pp. 647-653, 1999.

Jacobson et al., "Chemical Insect Attractants," *Science*, vol. 140, No. 3574, pp. 1367-1374, Jun. 28, 1963.

Wieting et al., "The Olfactory Responses of Flies in a New Type of Insect Olfactometer," *Journal of Economic Entomology*, vol. 32, No. 1, pp. 24-29, Feb. 1939.

International Search Report for PCT/US03/14458, Dec. 4, 2003.

* cited by examiner

ATTRACTANT SYSTEM FOR MOUNTING TO AN INSECT TRAPPING APPARATUS

FIELD OF THE INVENTION

The present invention relates to an attractant system for mounting to an insect trapping apparatus.

BACKGROUND OF THE INVENTION

Insect trapping apparatuses are well known in the art. For example, American Biophysics Corporation sells insect trapping apparatuses under the trademark MOSQUITO MAGNET that use combustion to generate a $CO_2$ laden outflow for attracting insects. Reference may be made to U.S. Pat. No. 6,145,243 and U.S. patent application No. 2003/0084604 A1 for details of the operation of such traps, the entirety of each of which is hereby incorporated into the present application by reference.

It is also known to supplement these traps with chemical attractants to better attract flying insects, such as mosquitoes, no-see-ums, etc. The MOSQUITO MAGNET apparatuses attract insects not only by emitting an outflow with a high $CO_2$ content from the combustion, it also uses octenol to enhance the attractiveness of the outflow.

Some scientific literature has suggested that it would be effective to use multiple chemical attractants to maximize the apparatus's ability to attract insects. While this would be beneficial, to be successful in the consumer marketplace the attractants should be provided to the end user in a relatively easy to use manner, and they should be packaged to ensure a suitable shelf life.

SUMMARY OF THE INVENTION

One aspect of the present invention provides an attractant system for mounting to an insect trapping apparatus. The insect trapping apparatus may be of any type suitable for capturing flying insects. For example, the apparatus may use combustion to generate a $CO_2$ enriched outflow for attracting insects, such as the MOSQUITO MAGNET apparatuses mentioned above, or may be of the type that do not rely on combustion, such as CDC light traps.

The attractant system comprises a housing defining at least a first chamber and a second chamber. The chambers may have any configuration and additional chambers may be provided. The housing is constructed to be mounted to the apparatus in any suitable manner. For example, in the MOSQUITO MAGNET apparatuses, the housing could be mounted in the outflow tube so as to allow the attractants carried in the chambers of the housing to diffuse into the outflow, thereby enhancing the outflow's attractive effect. The housing may alternatively be mounted in any suitable manner and in any suitable location on an insect trapping apparatus. In some apparatuses, the attractant housing may be mounted somewhere other than in an outflow, or the apparatus may not even have an outflow.

A first diffusible insect attractant is carried in the first chamber, and a second insect attractant is carried in the second chamber. The first and second attractants are of the type that may chemically react with one another. For example, one may be acidic, and the other may be basic, thus causing the attractants to react with one another if allowed to intermingle. The first and second chambers each have at least one opening for enabling the insect attractants to be released therethrough. The first and second attractants are essentially isolated from one another by one or more removable seals that close the openings of the chamber to essentially prevent intermingling of the insect attractants. These seals are removable to open the openings of the chambers to allow the insect attractants to diffuse therefrom so as to attract insects to the trapping apparatus when the housing is mounted thereto.

By isolating the chambers as such, the attractants will not be allowed to intermingle with each other until the one or more seals are removed from the openings of the chambers. This is advantageous for the consumer market, as it is likely that there will be a significant time period from the manufacturing of the attractant system to the time the end user purchases it and uses it on his/her trapping apparatus. If the attractants were communicated with each other during this time period, they may diffuse, intermingle, and react with each other, thereby depleting the amount of attractant, and possibly creating a by-product that is not effective as an attractant.

Another aspect of the invention provides an attractant system that mounts to a receptacle by insertion. Specifically, the attractant system of this aspect of the invention is for mounting to a receptacle on an insect trapping apparatus, wherein the receptacle has an interior space and an open end. The system comprises a housing defining at least a first chamber and a first diffusible insect attractant carried in the first chamber. The first chamber has at least one opening for enabling the first diffusible insect attractant to diffuse therethrough. The housing is configured to enable the attractant system to be mounted to the insect trapping apparatus by inserting the housing into the interior space of the receptacle through the open end thereof with an engagement between the housing and the receptacle releasably retaining the housing in the receptacle. The engagement may be structures such as tab and openings, or may be frictional.

Other objects, features, and advantages of the present invention will become apparent from the following detailed description, the accompanying drawings, and the appended claims.

DETAILED DESCRIPTION OF THE ILLUSTRATED EMBODIMENT(S) OF THE INVENTION

Figure 1:
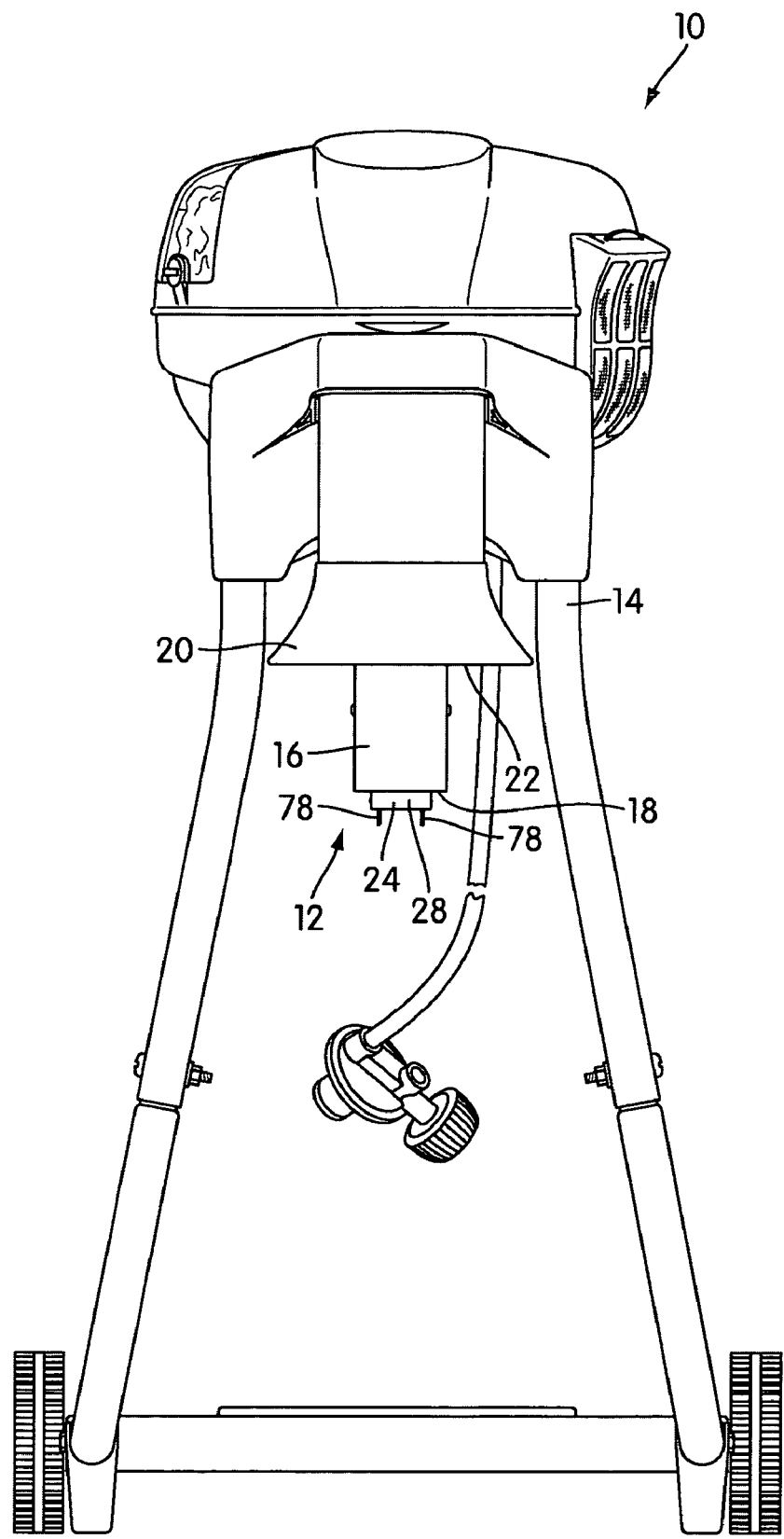
FIG. 1 is a front elevational view of an exemplary insect trapping apparatus with an attractant system constructed in accordance with one embodiment of the invention mounted thereto.
Figure 2:
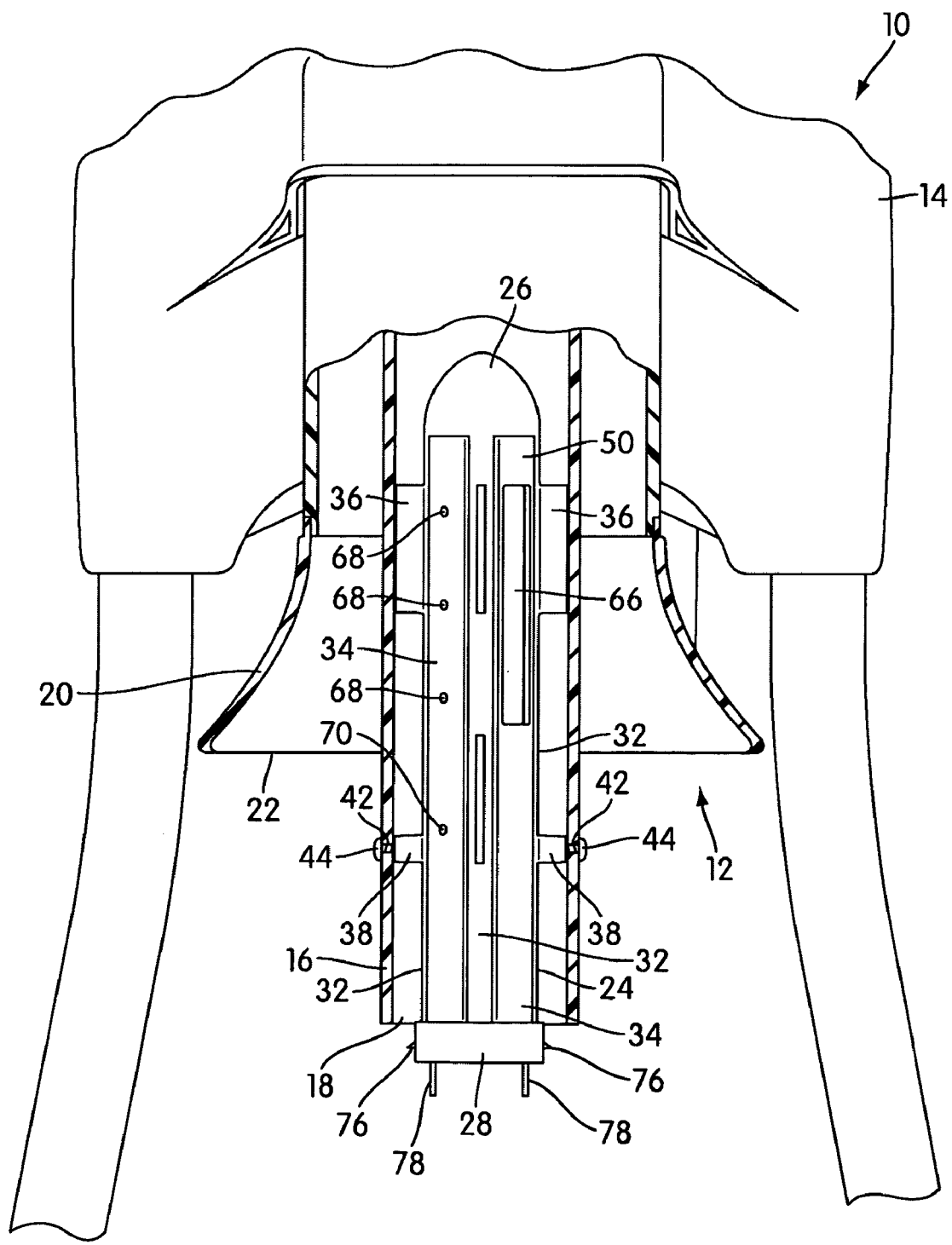
FIG. 2 is a partial cross-section of the inlet and outlet tubes of the apparatus in FIG. 1, the cross-section showing the receptacle and attractant system.
Figure 3:
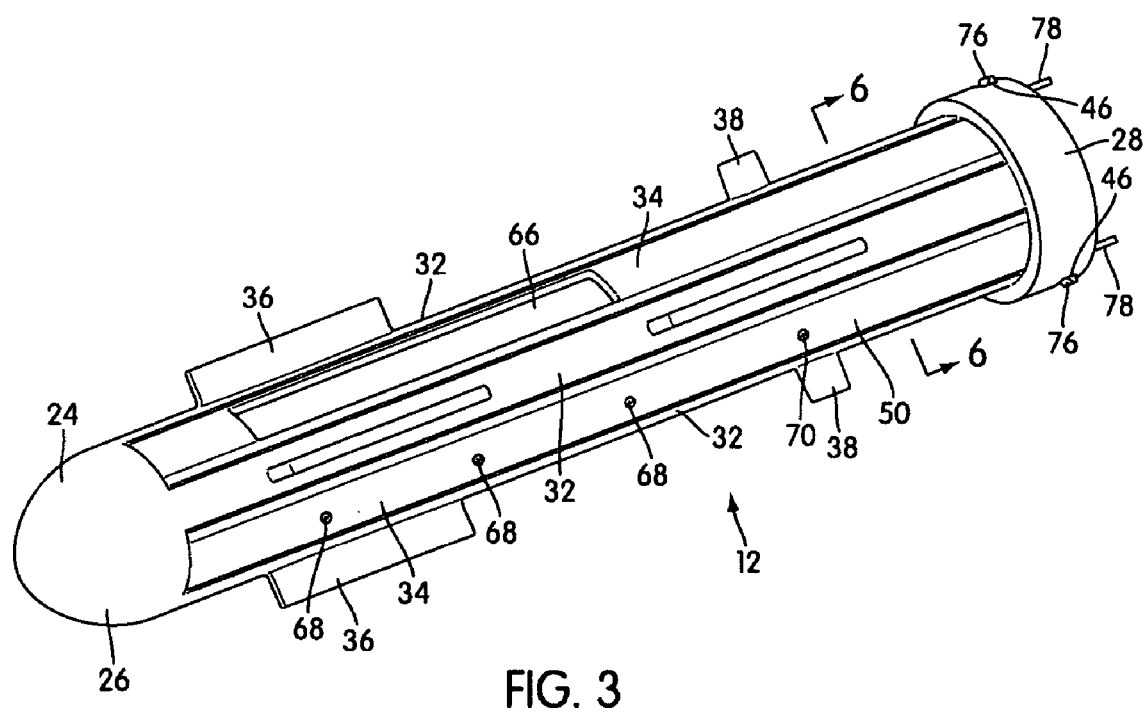
FIG. 3 is a perspective view of the receptacle and the attractant system with the attractant system inserted longitudinally into the receptacle.
Figure 4:
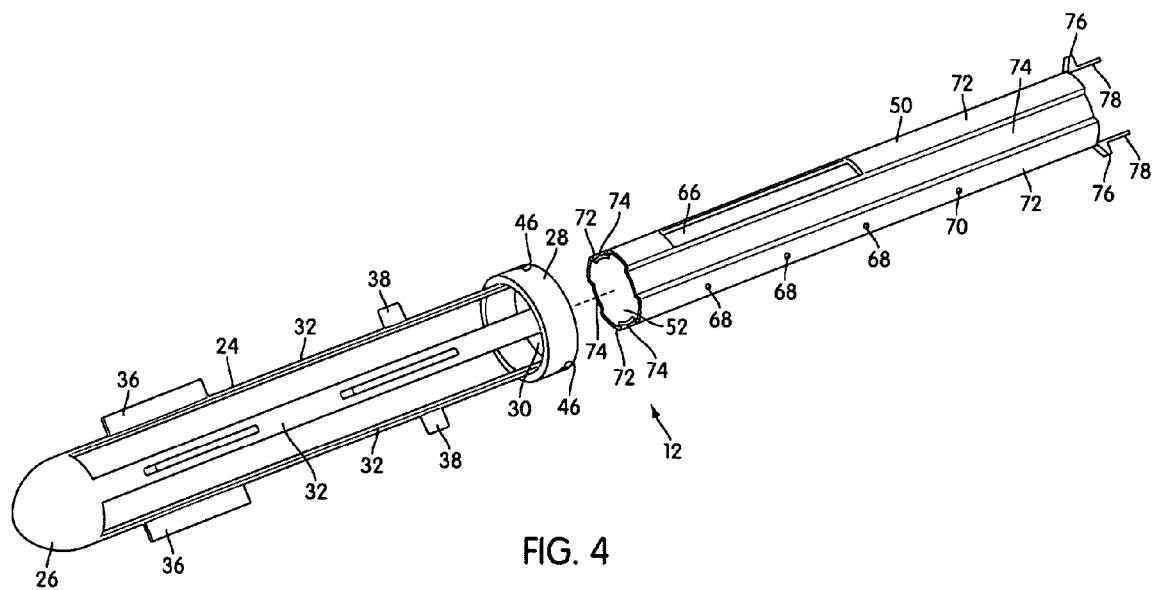
FIG. 4 is a perspective view of the receptacle and the attractant system with the attractant system withdrawn from the receptacle.
Figure 5:
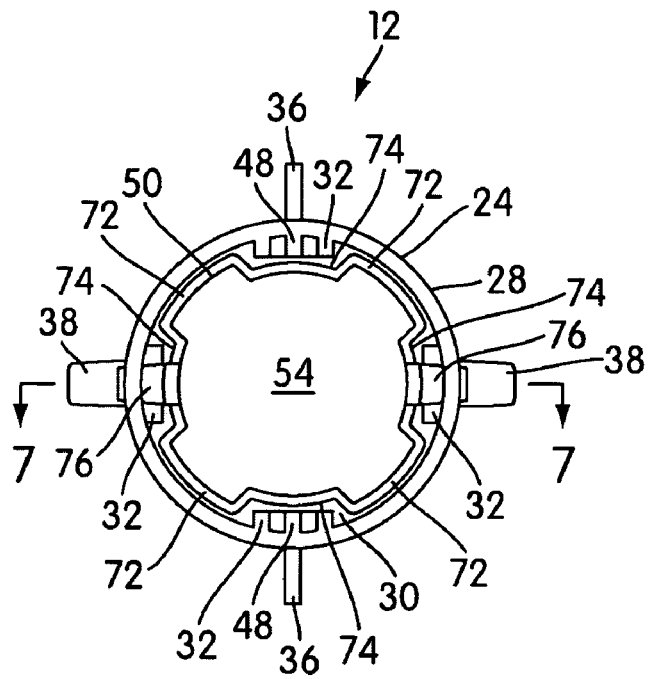
FIG. 5 is a bottom end view of the attractant system inserted longitudinally into the receptacle.
Figure 6:
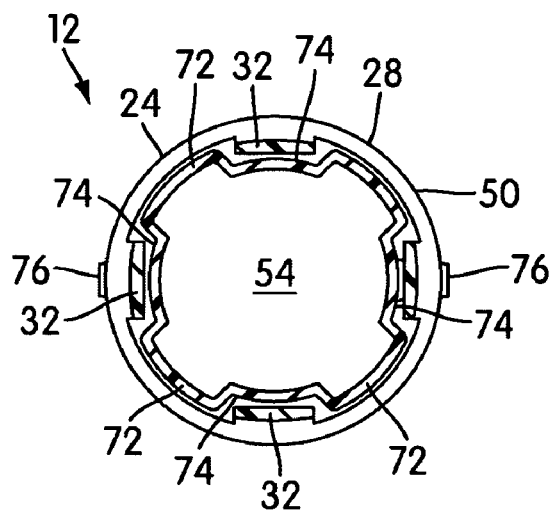
FIG. 6 is a cross-section taken along line 6-6 in FIG. 3.
Figure 7:
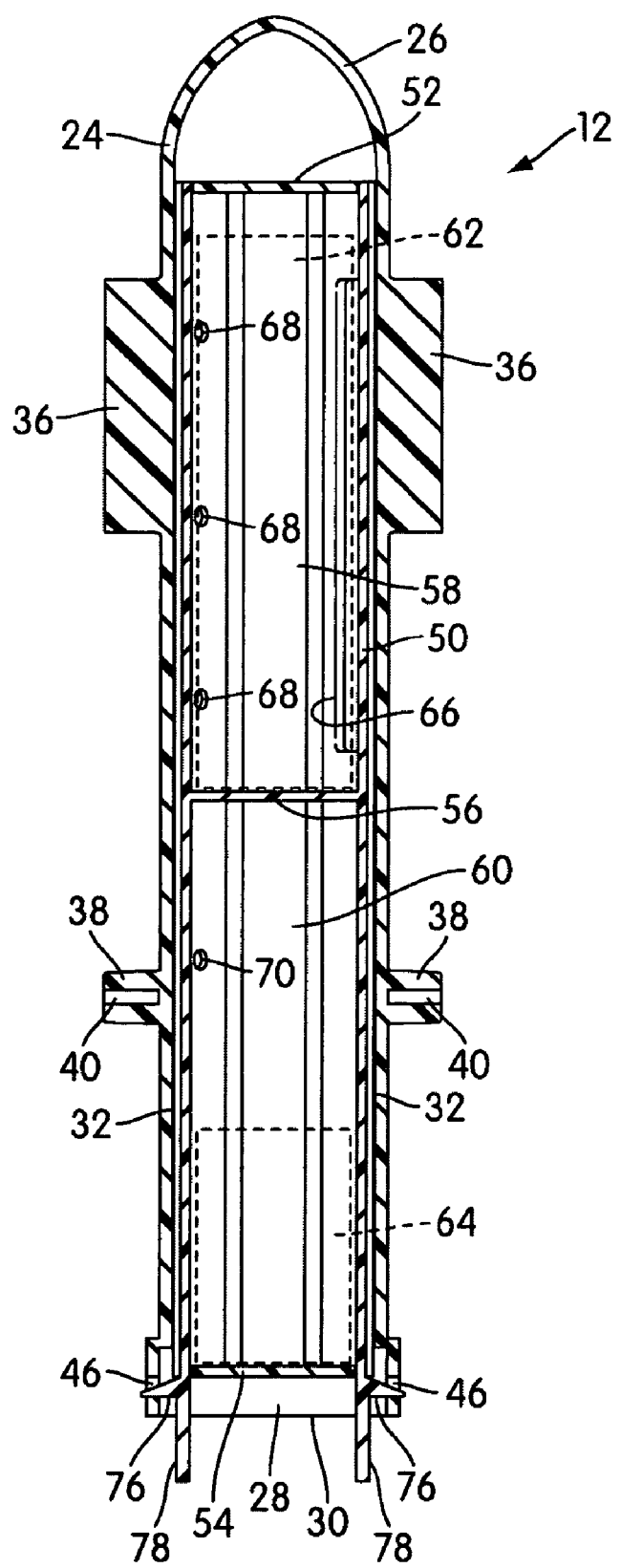
FIG. 7 is a cross-section taken along line 7-7 in FIG. 5.
Figure 8:
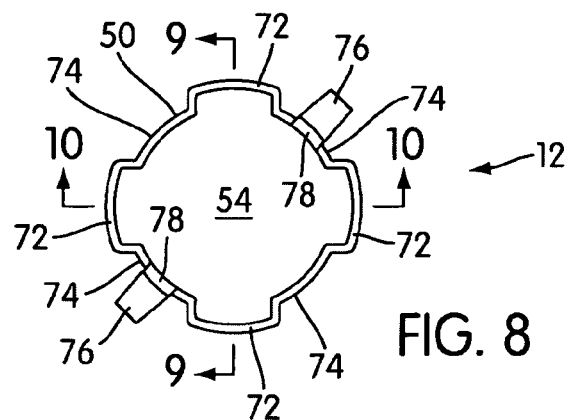
FIG. 8 is a bottom end view of the attractant system.
Figure 9:
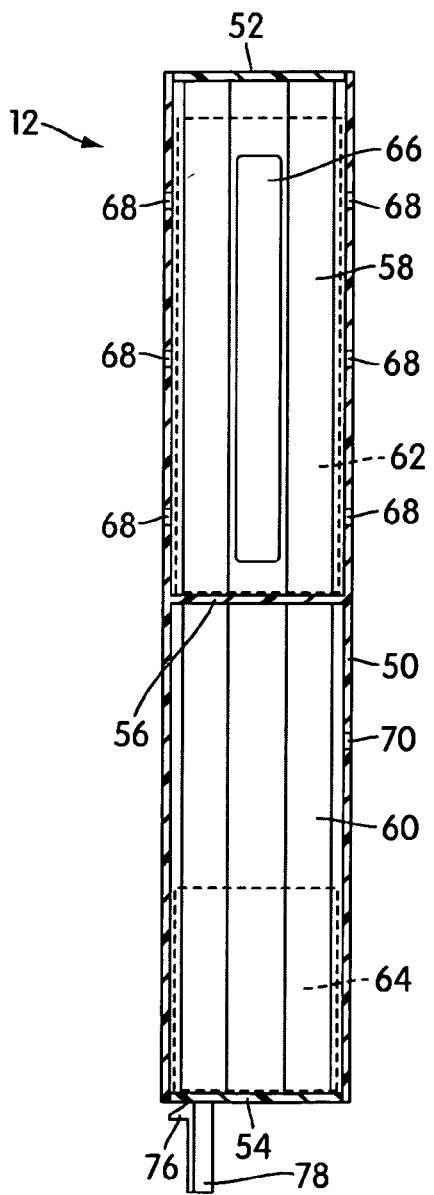
FIG. 9 is a cross-section taken along line 9-9 of FIG. 8.
Figure 10:
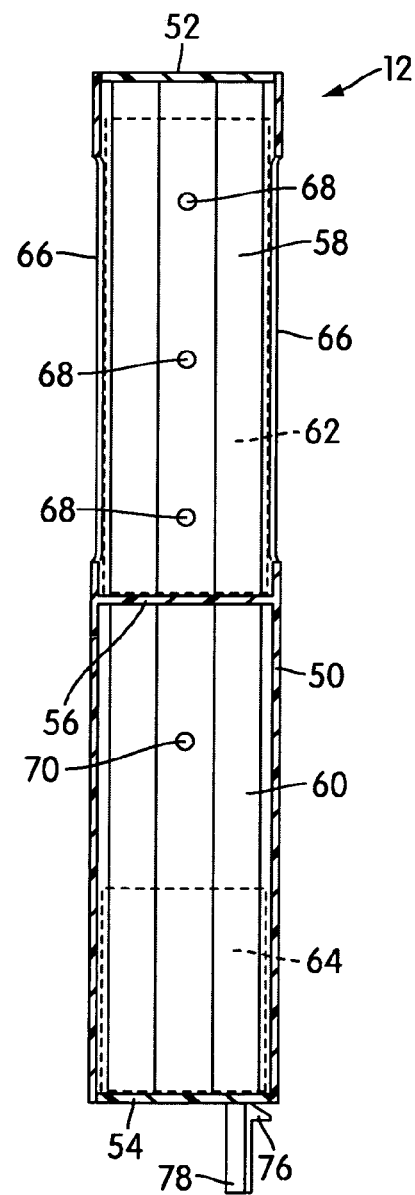
FIG. 10 is a cross-section taken along line 10-10 of FIG. 9.
Figure 11:
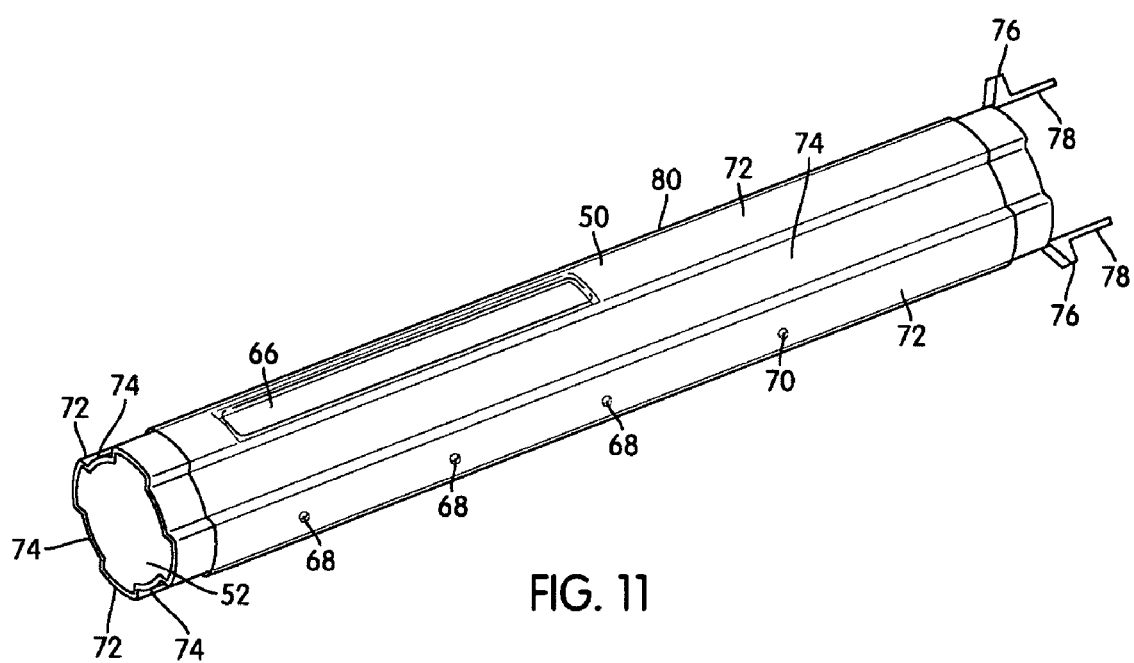
FIG. 11 is a perspective view of the attractant system with a plastic film heat shrunk thereon to seal its openings.

FIG. 1 shows an example of an insect trapping apparatus, generally indicated at 10, with which the attractant system, generally indicated at 12, may be used. The apparatus 10 shown in FIG. 1 is the MOSQUITO MAGNET LIBERTY, which is described in U.S. patent application No. 2003/0084604 A1 filed Oct. 4, 2002. The attractant system 12 may also be used with any other type of insect trapping apparatus, such as other combustion based types, and non-combustion based types, such as the CDC light trap. For other patents/applications illustrating examples of such apparatuses, reference may be made to U.S. Pat. Nos. 6,286,249, 6,145,243, and U.S. patent application. Ser. No. 10/445,245, filed May 27, 2003; Ser. No. 10/445,199, filed May 27, 2003; and Ser. No. 10/686,815, filed Oct. 17, 2003. Each of the patent applications mentioned above, or otherwise mentioned anywhere else in the present application, are hereby incorporated by reference into the present application in their entirety.

The trapping apparatus 10 includes a supporting frame 14 with a combustion device (not shown) mounted inside the frame 14. The combustion device connects to a propane tank (not shown) by a conventional regulator and functions to catalytically combust the propane to generate an exhaust gas. The exhaust gas has a high CO2 content and contains moisture from the catalytic reaction. Further details concerning this operation are found in the aforementioned patents/applications. The exhaust gas flows outwardly from an outlet tube 16 defining a downwardly facing outlet opening 18. This allows a plume of the exhaust gas to flow downwardly from the outlet opening 18 and then spread out from the apparatus 10. Mosquitoes and other insects that are highly sensitive to CO2 will be attracted to the plume and follow it to its source, namely the outlet opening 18.

The outlet tube 16 is mounted concentrically within an inlet tube 20 having a downwardly facing annular opening 22. The inlet tube 20 and the inlet opening 22 are communicated to an airflow generator in the form of a fan (not shown) mounted inside the frame 14. The fan draws an inflow in through the inlet opening 22 and the inlet tube 20. The inflow flows adjacent and counter the outflow so as to draw the insects that are attracted to the outflow and flying towards the outflow opening 18 into the inlet opening 22 and the inlet tube 20. Typically, most insects will follow the upper edge of the outflow, so positioning the inflow so that it flows counter and adjacent to upper edge of the outflow is advantageous for capturing those insects.

An insect trap chamber (not shown) is also mounted in the frame 14. The insect trap chamber may be either upstream or downstream of the fan, but in either case the fan causes the inflow to flow into the insect trap chamber. The insect trap chamber may have any construction, and in the illustrated apparatus 10 it is a mesh bag. As the inflow flows into the insect trap chamber, insects drawn in with the inflow are captured. Once captured, they can be left to die by dehydration/starvation, or poison may be used inside the insect trap chamber. Also, the trapping apparatus 10 could use an electrocution system for killing the insects. As another alternative, instead of killing the insects, the trapping apparatus 10 may be used for scientific study purposes with the insects being removed from the trapping apparatus 10 alive.

The attractant system 12 is designed to be mounted inside the outlet tube 16 of the apparatus 10. However, the system 12 may be configured to mount in the outlet tube of any other type of apparatus, or at any other location on any type of apparatus. Generally, the attractant system may have any construction or configuration, and the one illustrated herein is not intended to be limiting.

To accommodate receipt of the system 12, a receptacle 24 is mounted inside the outlet tube 16. For convenience, references made here to directions with respect to the attractant system 12 or the receptacle 24 are made with respect to the orientation in which they are installed in the apparatus 10.

The receptacle 24 may be provided as an original part of the apparatus 10, or it may be sold as a retrofit kit. The receptacle 24 is shown in FIGS. 3-7. The receptacle 24 is generally elongated with a closed and rounded upper end cap 26, and an annular ring 28 at its bottom end defining a downwardly facing opening 30. Four elongated members 32 extend longitudinally between the end cap 26 and the ring 28 to connect the same together, although any number of such members 32 may be used. These members 32 are generally parallel to one another and define a series of longitudinally extending apertures 34 therebetween. This construction defines an interior space with an open end (i.e., opening 30). The space has a cross-sectional configuration that is essentially consistent along the length of the receptacle 24 between ring 28 and end cap 26 (the cross-section being taken essentially perpendicular to the longitudinal direction of the receptacle 24).

The receptacle 24 also has a series of wings 36 extending outwardly from the members 32, and each of an opposing pair of the members 32 has a post 38 extending outwardly therefrom. The posts 38 have internal bores 40 and the outlet tube 16 of the apparatus 10 has a pair of diametrically opposed fastener receiving openings 42. To mount the receptacle 24 within the outlet tube 16, the receptacle 24 is inserted into the tube 16 to align the internal bores 40 of the posts 38 with the fastener receiving openings 42 of the tube 16. Fasteners, such as screws 44, are inserted through the openings 42 and into the bores 40 to secure the receptacle 24 within the tube 16. The wings 36 are configured so that they engage the inner surface of the outlet tube 16 to stabilize the receptacle 24 within the outlet tube 16. The wings 36 also create space between the main body of the receptacle 24 and the inner surface of the outlet tube 16 for allowing the outflow to flow around and past the receptacle 24. The invention, however, is not limited to this mounting arrangement, and any other suitable manner of mounting the receptacle 24 may be used.

In the illustrated embodiment, the receptacle 24 is molded integrally as a one-piece plastic part. This is preferred for cost savings reasons. However, the receptacle 24 may be made in any suitable manner, and may have any construction and configuration. The receptacle 24 illustrated is provided for illustrative purposes and is not intended to be limiting.

The ring 28 has an internal diameter that matches up with the external surfaces of the walls 32. A first diametrically opposed pair of the walls 32 extends for a small extent along the inner surface of the ring 28. The ring 28 has a pair of diametrically opposed tab receiving openings 46. These openings 46 are axially with and spaced from the ends of the first diametrically opposed pair of walls 32 mentioned above. A second diametrically opposed pair of the walls 32 extends along the entire axial length of the inner surface of the ring 28 and each defines a series of ridges 48 of their ends. The arrangement of these structures can be appreciated from FIGS. 4-7.

The attractant system 12 has an elongated generally cylindrical housing 50. The housing 50 has an upper end wall 52, a lower end wall 54, and a central wall 56. A first chamber 58 is defined between the upper end wall 52 and the central wall 56, and a second chamber 60 is defined between the central wall 56 and the lower end wall 54. A first diffusible insect attractant 62 is carried in the first chamber 58, and a second diffusible insect attractant 64 is carried in the second chamber.

The insect attractants 62, 64 may be of any type, and generally will be of the type that may chemically react with one another. In one embodiment, it is contemplated to use lactic acid released from a lactic acid gel as the first insect attractant 62, and ammonia gas released from an ammonia source, such as a powdered ammonium bicarbonate as the second insect attractant 64. Because lactic acid is an acid and ammonia is a base, these are examples of attractants that would react with one another, as acids and bases can react to form a salt. Any other diffusible liquid, solid, or semi-solid insect attractants may be used, and these examples should not be considered limiting. Although the chambers 58, 60 are shown as being axially adjacent one another, they could extend adjacent one another for the longitudinal length of the housing 50, or be arranged in any other manner. Reference may be made to U.S. patent application Ser. No. 10/431,586, the entirety of which is hereby incorporated into the present application by reference, for details on the lactic acid gel and other insect attractants, for example.

The housing 50 has a plurality of openings therein to enable diffused insect attractant to flow out from the chambers 58, 60. The size, number and arrangement of the openings depend on the desired release rate for the attractants 62, 64 in the chambers 58, 60. Thus, the size, number and arrangement of the openings may vary, and the openings in the illustrated embodiment are not intended to be limiting.

The first chamber 58 has a pair of relatively large rectangular openings 66 extending axially on one pair of diametrically opposing sides of the chamber 58. The first chamber 58 also has a series of axially spaced, relatively small openings 68 on another pair of diametrically opposing sides of the chamber 58. The second chamber 60 has a single relatively small opening 70 spaced axially from the opening 68.

The external configuration of the housing 50 can best be appreciated from FIGS. 4-6 and 8. A series of ridges 72, four as illustrated, extend axially along the length of the housing 50, except where interrupted by openings. These ridges 72 define a corresponding series of grooves 74 therebetween that also extend axially along the length of the housing 50. The cross-section of the housing 50 (taken essentially perpendicular to its longitudinal direction) closely matches the cross-section of the interior space of the receptacle 24. This enables the system 12 to be mounted to the apparatus 10 by inserting the housing 50 longitudinally into the elongated interior space of the receptacle 24.

To mount the attractant system 12 to the receptacle 24, which is already mounted to the apparatus 10, the housing 50 is aligned axially with the opening 30 of the receptacle's ring 28 so that the housing's grooves 74 align axially with the receptacle's members 32 and the housing's ridges 72 align axially with the openings 34 defined between the members 32. The user then slides the housing 50 axially into the interior of the receptacle 24. When the housing 50 is fully inserted, the upper ends of the ridges 72 will abut against the lower edge of the end cap 26 to limit further axial movement.

Also, the lower end of the housing 50 has a pair of engaging tabs 76 carried on resiliently flexible arms 78. These tabs 76 are releasably received in the tab receiving openings 46 of the ring 28. The engagement of the tabs 76 within the openings 46 inhibits the housing 50 from sliding out of the receptacle 24, such as by gravity. To release the housing 50 from the receptacle 24, the arms 78 can be resiliently flexed inwardly to withdraw the tabs 76 from the openings 46. These arms 78 may be formed integrally as one-piece with the housing 50 or formed separately and attached thereto.

The housing 50 is manufactured by injection molding the housing 50 itself and the center wall 56 as one piece, with the ends of the housing 50 being open. Then the openings 66, 68, 70 are cut-out. Alternatively, the openings 66, 68, 70 may be formed as part of the injection molding operation. Next, the attractants 62, 64 are placed in the chambers 58, 60 and the molded plastic end walls 52, 54 are fixedly attached to the open upper and lower ends of the housing 50 to close the same.

To seal the chambers 58, 60 and prevent the insect attractants 62, 64 from diffusing and intermingling with one another prior to use of the attractant system 12, one or more removable seals are provided to close the openings 66, 68, 70. Closing the openings 66, 68, 70 essentially isolates the chambers 58, 60 from one another to essentially prevent intermingling of the attractants (and the wall 56 keeps them physically separated and isolated as well). The term "essentially" is used to acknowledge the fact that minor errors or inconsistencies in manufacturing or design may allow for a slight amount of attractant 62, 64 to escape through the one or more seals, any slight gaps between the center wall 56 and the housing 50, and/or any slight gaps between the end walls 52, 54 and the housing 50. Of course, it is preferred that there be no such escape of attractant, but it is understood that some slight amount may escape.

By preventing the attractants from co-mingling prior to usage, their longevity and effectiveness during usage are enhanced. Specifically, in a retail store setting, the attractant system 12 is first made by the manufacturer, then packaged for shipping and delivered to the retail store, typically via the retail store's distribution center. Then, the attractant system 12 will be placed on a shelf or display rack until purchased and used by a consumer. The time period between manufacturing of the attractant system 12 and its use by a consumer may be a few weeks, and possibly over a month. If the attractants 62, 64 were allowed to intermingle with each other, they will become depleted by the time the user uses the system 12, thus reducing the period of time during which the attractants 62, 64 will function with a high level of efficiency. Thus, using one or more seals to close the openings 66, 68, 70 is desirable to prevent this intermingling from occurring. Also, using the wall 56 to keep the attractants 62, 64 physically separated during use minimizes any intermingling/reaction between the attractants 62, 64 within the housing 50.

In the illustrated embodiment the one or more seals is constituted by a plastic film 80. This plastic film 80 encircles the housing 50 and is heat shrunk thereon to cover the openings 66, 68, 70 of the chambers 58, 60. This is done by placing a tube of the film 80 over the housing 50, with the tube having a slightly larger diameter than the housing 50. Then, heat is applied to shrink the tube and cause the film 80 to firmly encase the housing 50 and close off the openings 66, 68, 70. The preferred film 80 for this application is a fluoropolymer, such as PTFE (also known as TEFLON) or PVDF-Kynar from 3M, a chlorinated polyolefin, such as a PVC or neoprene, or highly flexible elastomers, such as VITON from Dow Chemical.

Other types of seal(s) may be used instead of film 80. for example, adhesive strips may be used to cover and close off the openings 66, 68, 70. Generally, any suitable type of seal(s) may be used to close off the openings 66, 68, 70 and the size, shape and structure of such seal(s) may vary. Likewise, a plastic film sheet may be wrapped tightly around the housing 50 and secured in place. Also, in some configurations, deformable plugs could be forced into the various openings to seal them off. Further, the seals could be provided by break-away portions of the housing that are broken off and pulled away to expose the openings. The present invention is not limited to the examples mentioned herein, and thus the term seal encompasses any structure that closes off at least one opening of a chamber.

The contents of the U.S. patent application entitled "System for Trapping Flying Insects with Attractant Lures," filed even date herewith, is hereby incorporated into the present application by reference.

Prior to using the system 12 in apparatus 10, the user will remove the film 80, or whatever other seal is being used. This will permit the insect attractants 62, 64 to diffuse out through openings 66, 68, 70 to facilitate attracting insects to the apparatus 10.

The foregoing illustrated embodiment has been provided solely to illustrate the structural and functional principles of the present invention and should not be considered limiting. To the contrary, the present invention is intended to encompass all modifications, alterations and substitutions within the spirit and scope of the appended claims.

What is claimed is:

1. An attractant system for removable mounting to an insect trapping apparatus, the attractant system comprising:
   a housing defining at least a first chamber and a second chamber; the housing being constructed to be removably mounted to the insect trapping apparatus;
   a first diffusible insect attractant carried in the first chamber;
   a second diffusible insect attractant carried in the second chamber, wherein the first and second diffusible insect attractants may chemically react with one another;
   the first chamber having at least one opening for enabling the first diffusible insect attractant to be released therethrough to a surrounding environment;
   the second chamber having at least one opening for enabling the second diffusible insect attractant to be released therethrough to the surrounding environment;
   the at least one opening of the first chamber and the at least one opening of the second chamber being separate from one another so that the attractants diffuse and release separately through the respective openings, and the first and second chambers being constructed such that the first diffusible insect attractant releases to the surrounding environment only through the at least one opening of the first chamber and the second diffusible insect attractant releases to the surrounding environment only through the at least one opening of the second chamber;
   one or more removable seals removably mounted to each of the openings of the chambers, the one or more removable seals closing the openings to seal the chambers and isolate the chambers from one another for preventing diffusion of the first and second diffusible insect attractants through the openings and intermingling of the first and second attractants prior to removal of the one or more seals;
   the one or removable seals being removable to open the openings of the chambers to allow the insect attractants to release therefrom to the surrounding environment so as to attract insects to the insect trapping apparatus when the housing is mounted thereto.

2. An attractant system according to claim 1, wherein the housing includes an impermeable wall disposed between and separating the first and second chambers.

3. An attractant system according to claim 2, wherein the housing is generally cylindrical.

4. An attractant system according to claim 3, wherein the first chamber extends for one axial portion of the housing and the second chamber extends for another axial portion of the housing, with the wall disposed axially between the first and second chambers.

5. An attractant system according to claim 2, wherein the one or more removable seals is constituted by a plastic film covering the openings of the chambers and sealing each opening separately.

6. An attractant system according to claim 5, wherein the plastic film encircles the housing.

7. An attractant system according to claim 6, wherein the plastic film is heat shrunk thereon to cover and seal the openings of the chambers.

8. An attractant system according to claim 1, wherein the one or more removable seals is constituted by a plastic film covering the openings of the chambers and sealing each opening separately.

9. An attractant system according to claim 8, wherein the plastic film encircles the housing.

10. An attractant system according to claim 9, wherein the plastic film is heat shrunk thereon to cover and seal the openings of the chambers.

11. An attractant system according to claim 1, wherein the first insect attractant is an acid and the second insect attractant is a base.

12. An attractant system according to claim 11, wherein the first insect attractant includes lactic acid and the second insect attractant includes ammonia.

13. An attractant system according to claim 12, wherein the lactic acid is in a gel from which the lactic acid can be released.

14. An attractant system according to claim 12, wherein the ammonia is contained in ammonium bicarbonate from which the ammonia can be released.

15. An attractant system according to claim 5, wherein the first insect attractant is an acid and the second insect attractant is a base.

16. An attractant system according to claim 15, wherein the first insect attractant includes lactic acid and the second insect attractant includes ammonia.

17. An attractant system according to claim 16, wherein the lactic acid is in a gel from which the lactic acid can be released.

18. An attractant system according to claim 16, wherein the ammonia is contained in ammonium bicarbonate from which the ammonia can be released.

19. An attractant system according to claim 8, wherein the first insect attractant is an acid and the second insect attractant is a base.

20. An attractant system according to claim 19, wherein the first insect attractant includes lactic acid and the second insect attractant includes ammonia.

21. An attractant system according to claim 20, wherein the lactic acid is a gel from which the lactic acid can be released.

22. An attractant system according to claim 20, wherein the ammonia is contained in ammonium bicarbonate from which the ammonia can be released.

23. An attractant system according to claim 1, wherein the housing is formed of molded plastic.

24. An attractant system according to claim 5, wherein the housing is formed of molded plastic.

25. An attractant system according to claim 8, wherein the housing is formed of molded plastic.

26. An attractant system according to claim 1, wherein the first insect attractant is in a form selected from the group consisting of a solid and a semi-solid, and wherein the second insect attractant is in a form selected from the group consisting of a solid and a semi-solid.

27. An attractant system according to claim 26, which the first insect attractant is in the form of a semi-solid and the second insect attractant is in the form of a solid.

28. An attractant system according to claim 27, wherein the first insect attractant is in the form of a gel.

29. An attractant system according to claim 28, wherein the first insect attractant includes lactic acid contained in the gel.

30. An attractant system according to claim 29, wherein the second insect attractant is ammonia provided in the form of ammonium bicarbonate.

31. An insect trapping system, comprising:
   an insect trapping apparatus comprising:
      (i) a frame; and
      (ii) a trap on said frame for capturing insects; and
   an attractant system comprising:
      (i) a housing defining at least a first chamber and a second chamber; the housing being removably mounted to the frame of the insect trapping apparatus so as to enable removal and replacement of the attractant system;
      (ii) a first diffusible insect attractant carried in the first chamber;
      (iii) a second diffusible insect attractant carried in the second chamber, wherein the first and second diffusible insect attractants may chemically react with one another;
      (iv) the first chamber having at least one opening for enabling the first diffusible insect attractant to be released therethrough to a surrounding environment;
      (v) the second chamber having at least one opening for enabling the second diffusible insect attractant to be released therethrough to the surrounding environment;
      the at least one opening of the first chamber and the at least one opening of the second chamber being separate from one another so that the attractants diffuse and release separately through the respective openings, and the first and second chambers being constructed such that the first diffusible insect attractant releases to the surrounding environment only through the at least one opening of the first chamber and the second diffusible insect attractant releases to the surrounding environment only through the at least one opening of the second chamber; and
      (vi) one or more removable seals removably mounted to each of the openings of the chambers, the one or more removable seals closing the openings to seal the chambers and isolate the chambers from one another for preventing diffusion of the first and second diffusible insect attractants through the openings and intermingling of the first and second attractants prior to removal of the one or more seals;
   the one or removable seals being removable to open the openings of the chambers to allow the insect attractants to release therefrom to the surrounding environment so as to attract insects to the insect trapping apparatus when the housing is mounted thereto.

* * * * *